J. DUTHIE, Sr.
SHIP HULL CONSTRUCTION.
APPLICATION FILED MAY 16, 1919.

1,425,243.

Patented Aug. 8, 1922.

INVENTOR
John Duthie Sr.
BY
ATTORNEY

J. DUTHIE, Sr.
SHIP HULL CONSTRUCTION.
APPLICATION FILED MAY 16, 1919.
1,425,243.
Patented Aug. 8, 1922.
2 SHEETS—SHEET 2.
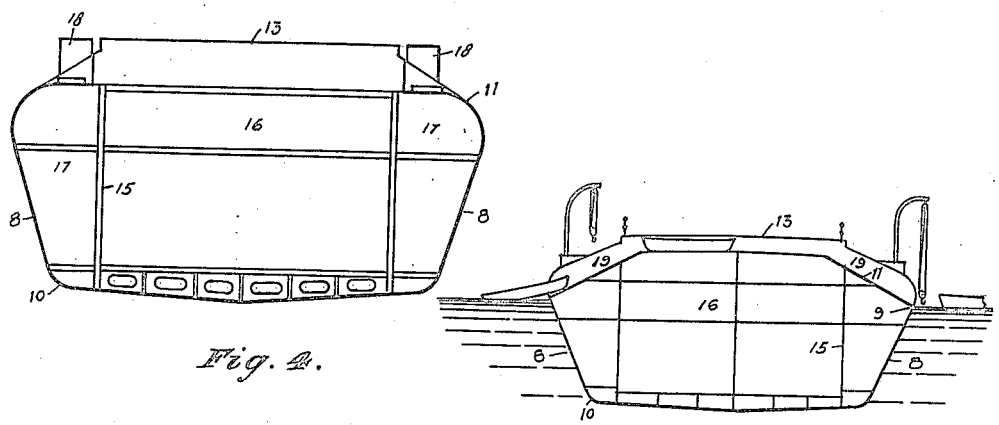
Fig. 4.
Fig. 5.
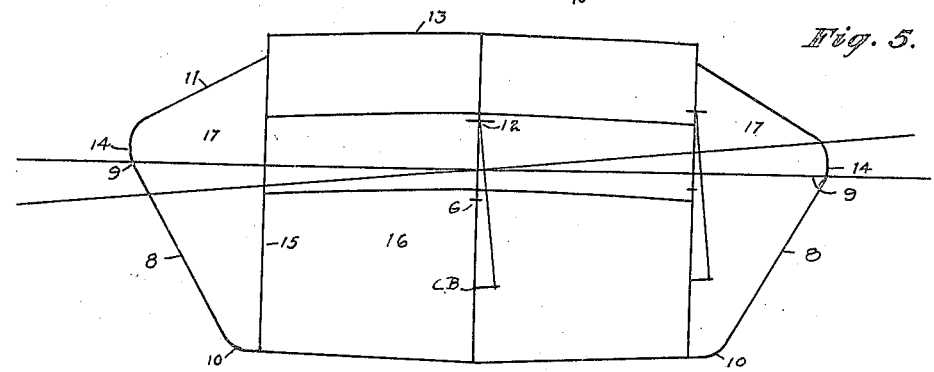
Fig. 6.
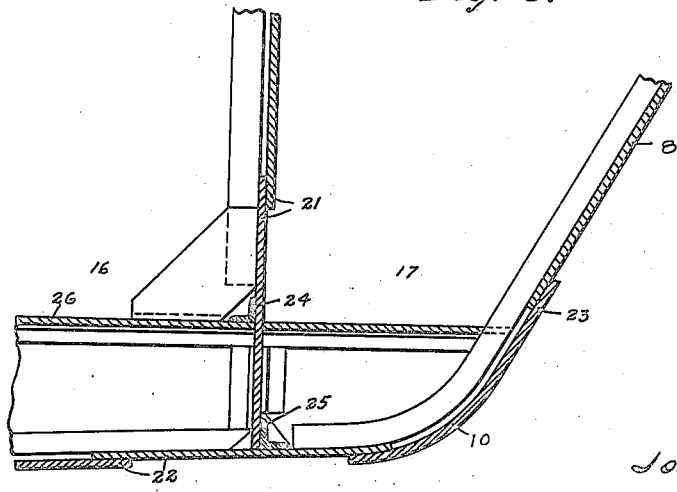
Fig. 7.
INVENTOR
John Duthie, Sr.
BY
G. Wright Arnold.
ATTORNEY

UNITED STATES PATENT OFFICE.

JOHN DUTHIE, SR., OF SEATTLE, WASHINGTON.

SHIP-HULL CONSTRUCTION.

1,425,243.  Specification of Letters Patent.  Patented Aug. 8, 1922.

Application filed May 16, 1919. Serial No. 297,463.

*To all whom it may concern:*

Be it known that I, JOHN DUTHIE, Sr., a citizen of the United States, residing at Seattle, in the county of King and State of Washington, have invented a certain new and useful Improvement in Ship-Hull Construction, of which the following is a specification.

My invention relates to ship hull construction, more particularly to the construction of hulls which afford the maximum safety, tonnage and metacenter stability and at the same time increase the speed per horse power per ton, and to the construction of hulls whose lateral walls are double.

Heretofore, ship hulls have been commonly constructed with their side walls approximately vertical. The objection to such construction is that having a vessel of given length, draught, metacentric stability and speed, no increase in cargo, tonnage, carrying capacity can be made without a sacrifice of one of these elements, that is, an increase in length or draught would have to be made or a lesssening of the speed by broadening the vessel and decreasing her speed per horse power per ton. Moreover, such vertical wall construction presents to a colliding object the maximum plate surface of the ship to be damaged and does not adapt the ship to move laterally from such a colliding object by way of giving way to such lateral pressure or afford a runway for the launching of life-boats directly into the water.

The object of my invention is to provide a ship hull; which provides a greatly increased tonnage for a hull of a given length and given draught than heretofore provided and at the same time greatly increases the metacentric stability of the vessel by providing an immersed wedge of maximum efficiency, and which greatly increases the speed per horse power per ton; and provides for the safe launching of the life-boats.

Also hulls as heretofore constructed are not self-supporting as respects buoyancy at their end portions, thus necessitating regard to a longitudinal metacenter. One of the objects of this invention is to provide a hull the end portions of which are self-supporting as respects buoyancy and in which hull the consideration of the longitudinal metacenter is eliminated.

Moreover, heretofore it has been the practice in providing ships with two hulls to simply form the hull with two walls, as it were, the transverse metacenter of the ship remaining unchanged by the addition of the second wall or hull. The objection to this construction of the hull is that the second hull functions only as an imperfect protector against punctures, operating only as an ordinary bulkhead, and makes no provision for the balancing of the vessel when the outer wall is pierced.

One of the primary objects of my invention is to provide a ship hull which, as respects its side wall portions, is provided with a second side wall, which really constitutes the vessel a ship within a ship, so that the metacenter of the ship formed by the inner wall is not operative, the ship normally operating upon the metacenter formed by the new outer wall, which, when punctured, causes the ship to maintain its equilibrium; and as respects said double wall portion, it is one of the objects of my invention to provide a new form of connecting the inner and outer hull portions in general at the bilge line.

To the ends of attaining the aforesaid objects, I provide a ship hull whose lateral walls, as respects their lower portions, recede approximately from the water line to the bilge and, as respects their upper portions preferably recede to the deck approximately from a point horizontally opposite the transverse metacenter, and, further, in attaining the aforesaid objects, relative safety against the danger of puncture, I provide a ship hull whose side walls are formed as above set forth with an inner hull which is complete in and of itself, having its metacentric stability carefully determined.

The above mentioned general objects of my invention, together with others inhering in the same, are attained by the mechanism illustrated in the following drawings, the same being merely a preferred exemplary form of embodiment of my invention, throughout which drawings like reference numerals indicate like parts.

Figure 4, is a view in sectional elevation on broken line 4, 4 of Figure 1;

Figure 5, is a view in section on broken line 5, 5 of Figure 1;

Figure 6, is a diagrammatic view in section on broken line 6, 6 of Figure 1, showing the location of the metacenter, center of gravity and center of buoyancy;

Figure 7, is an enlarged view of the special form of construction of the inner and outer hull portions along the bilge line.

Figure 1:
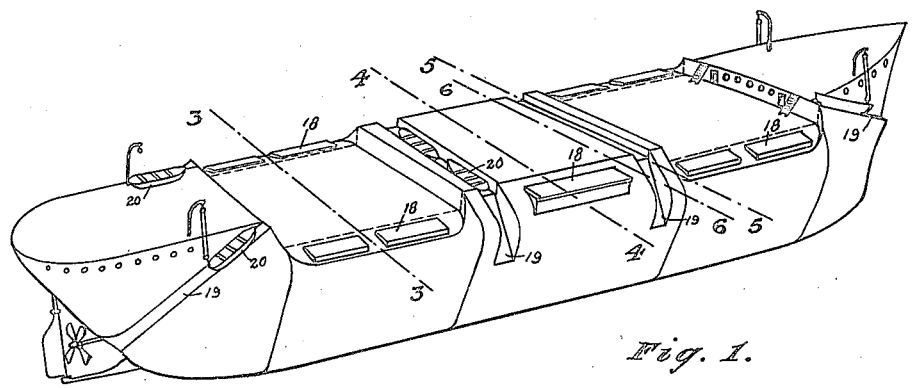
Figure 1, is a view in perspective elevation of a ship embodying my invention.
Figure 2:
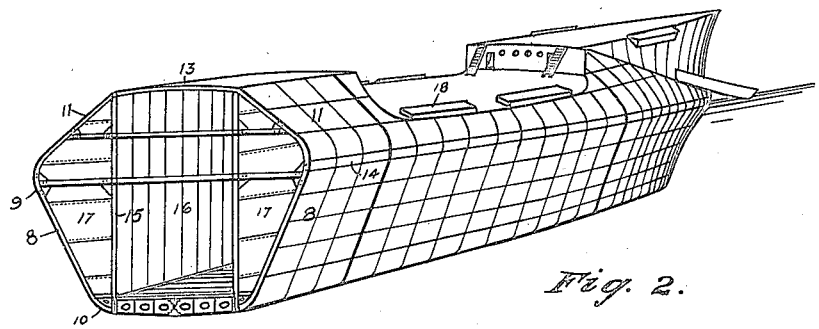
Figure 2, is a view in sectional elevation of the forward half portion of the hull of a ship embodying my invention.
Figure 3:
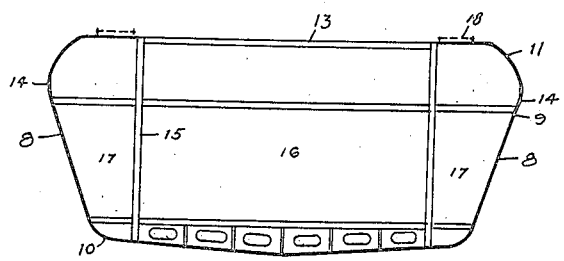
Figure 3, is a view in sectional elevation on broken line 3, 3 of Figure 1.

Referring to the drawings, the side wall as respects its lower portion 8 recedes approximately from the water-line 9 to the bilge 10 and as respects its upper portion 11 recedes approximately from a point horizontally opposite the transverse metacenter point 12 to the deck 13.

That comparatively small part 14 of the side wall between said point horizontally opposite the metacenter point and the water-line 9 may be, and preferably is vertical. This side wall may be constructed in accordance with any approved system of construction and bracing.

To secure safety, I preferably provide an inner hull with sides 15, which are preferably vertical to form as free an inner cargo hold 16 as possible and also as free and convenient an outer cargo hold 17 as possible. This inner hull has its metacenter determined and has its wall formed preferably intact throughout so that in the event of puncturing the outer hull there is no question of water entering the inner hull owing to the negligent omission of closing water-tight doors. Separate hatches 18 serve the cargo space 17. Runways 19 permit the launching of the life-boats 20. In order that the bow may the better divide the water, the portion 8 of the side walls of this part of the hull are concave.

In constructing the hull, I provide a secure water-tight connection of maximum strength of the two hull portions along the bilge line by extending the interior hull shell plating 21 to the bottom shell plating 22, the bottom shell portion being continuous with the side hull shell plating 23. Angle irons 24 and 25 secure the interior wall to the top of the ballast tank 26 and the bottom shell plating 22. This construction eliminates the marginal plate which ordinarily serves as a side wall to the ballast tank. The longitudinal and transverse strains arising from the ship's pitching and rolling most commonly cause leaks along the bilge line portion so that the providing of a double protection as herein set forth is most important.

The operation of my invention is as follows:—

By having the hull widest along the water-line, manifestly I provide an immersed wedge portion of maximum efficiency,—the lever arm being longest therethrough and the cargo occupying the immersed portion would tend to right the ship by exerting a downward force. By having the portion 11 recede to the deck, I eliminate weight above the water-line which weight otherwise would tend to operate against the stabilizing forces by raising the center of gravity. By having the portion 8 recede to the bilge, the effectiveness of the immersed and emersed wedge portion is greatly increased and such recession also serves to cut down the amount of displacement, so that the speed of the hull is not decreased but is increased per horse power per ton.

The increased displacement (and therefore the increased buoyancy) arising from the portion denominated 17, provides for approximately a 50% increase in cargo carrying capacity over the inner hull when the draught and the length remain constant.

Such portion 17 on the end portions of the hull clearly serves to buoy up these parts of the vessel, so that they are self-supporting and are not carried by the mid-ship portions as is the case in the vertical wall vessels of common practice. The sides of the portion 17 at the extremities can be made commensurate with and suitable to the decreased load of these parts of the hull. In this manner the longitudinal metacenter is eliminated.

Furthermore, by constructing the hull to present a narrow exterior wall portion 14, the hull embodying my invention presents a minimum of surface to a colliding object such as an iceberg, and would tend to cut a groove in such object rather than rake a considerable portion of the plates off the vessel, and as the portion 8 recedes to the bilge, provision is made for the hull to move easily in a lateral direction upon colliding on the opposite side with an obstructing object. The form of hull which I provide, it will be noted, operates as an arch against lateral compression, which therefore provides a very strong ship.

By causing the upper portion 11 to serve as supports for the run-ways 19 for launching the life-boats 20 directly into the water, all the difficulty of lowering a life-boat in rough seas is eliminated.

In providing a hull as above set forth with an inner hull with its metacenters determined, I establish a construction possessing exceptional strength, not only as respects bracing and reinforcing but also functioning to relieve the inner hull in a large measure of the strain of confining the cargo in the hold 16,—its righting moments cooperating with those of greater efficiency of the outer hull although not operative to the extent of determining the movements of the vessel whose "behavior" is molded entirely by the righting moments established by having the greatest width of the water-line and keeping the center of gravity as low as possible, that is by making the water-line the approximate angle point of the lateral wall.

A very high degree of safety is insured by this hull within a hull construction as respects the lateral walls, since if the outer hull is punctured the metacenter stability of the inner hull would then come into operation, and by the aid of the cargo in the hold 17 opposite such punctured section would maintain the vessel's balance. Moreover, the cargo in such portion 16 would serve as a buffer to protect the inner hull against the puncturing object.

Obviously, changes may be made in the forms, dimensions and arrangements of the parts of my invention, without departing from the principle thereof, the above setting forth only a preferred form of embodiment. Clearly, the advantages of the inner hull may be approximated by a construction whose walls are not wholly free of openings. Likewise, such advantages may be approximated when such walls do not constitute strictly an inner hull, that is are not constructed in accordance with naval architecture principles, so that if such hull were to be set in the water by itself it would not have a proper metacentric stability. Furthermore, the advantage of my invention might be approximated by a hull in which lateral walls do not recede approximately at the water-line to the bilge, and the deck respectively from the stem to the stern, but all such constructions would come within the meaning of the terms herein employed,—the said construction differing only in attaining the advantages of my preferred form in a less degree.

Having thus described my invention, what I claim is:

1. In a ship's double hull with a double bottom, or tank, side bulkheads inboard of the side plating and extending from the deck straight through the tank top and to the bottom, and rigidly connected to the tank top and bottom, the side plating receding inwardly from the water-line to the bilge where it is spaced from the lower end of the side bulkheads, and to the deck.

2. A ship's double hull provided with an exterior auxiliary side wall which recedes approximately from the water-line to the bilge and to the deck respectively, and whose interior side wall plating extends to the bottom shell plating, thereby serving as a side wall to the ballast tank, said bottom shell plating being continuous with the exterior auxiliary side wall shell plating, and said interior side wall being connected to the top of the ballast tank by an angle iron and to the bottom shell plating by an angle iron, whereby is afforded a water-tight connection of maximum strength from stem to stern, the top of said ballast tank extending outward to the exterior shell plating.

In witness whereof, I hereunto subscribe my name this 9th day of May, A. D., 1919.

JOHN DUTHIE, Sr.